(12) United States Patent
Chen et al.

(10) Patent No.: US 10,509,452 B2
(45) Date of Patent: Dec. 17, 2019

(54) HIERARCHICAL POWER DISTRIBUTION IN LARGE SCALE COMPUTING SYSTEMS

(71) Applicant: Advanced Micro Devices, Inc., Sunnyvale, CA (US)

(72) Inventors: Xinwei Chen, Atlanta, GA (US); Leonardo de Paula Rosa Piga, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 82 days.

(21) Appl. No.: 15/498,099

(22) Filed: Apr. 26, 2017

(65) Prior Publication Data

US 2018/0314306 A1 Nov. 1, 2018

(51) Int. Cl.
- *G06F 1/26* (2006.01)
- *G06F 1/3296* (2019.01)
- *G06F 1/3234* (2019.01)
- *G06F 1/324* (2019.01)

(52) U.S. Cl.
CPC .............. *G06F 1/266* (2013.01); *G06F 1/324* (2013.01); *G06F 1/3234* (2013.01); *G06F 1/3296* (2013.01)

(58) Field of Classification Search
CPC .... G06F 1/266; G06F 9/44505; G06F 1/3203; G06F 1/3234; G06F 9/522
See application file for complete search history.

(56) References Cited

U.S. PATENT DOCUMENTS

| | | | |
|---|---|---|---|
| 2009/0064165 A1* | 3/2009 | Arimilli | G06F 9/5083 718/105 |
| 2009/0319808 A1* | 12/2009 | Brundridge | G06F 1/189 713/300 |
| 2010/0095090 A1* | 4/2010 | Unno | G06F 9/522 712/30 |

(Continued)

OTHER PUBLICATIONS

Lefurgy, C. et al., "Power Capping: a Prelude to Power Shifting", Cluster Computing, Jun. 2008, pp. 183-195, vol. 11, Issue 2, Springer US, USA.

(Continued)

*Primary Examiner* — Jaweed A Abbaszadeh
*Assistant Examiner* — Gayathri Sampath
(74) *Attorney, Agent, or Firm* — Joshua A. Hamberger

(57) ABSTRACT

Techniques for managing power distribution amongst processors in a massively parallel computer architecture are disclosed. The techniques utilize a hierarchy that organizes the various processors of the massively parallel computer architecture. The hierarchy groups numbers of the processors at the lowest level. When processors complete tasks, the power assigned to those processors is distributed to other processors in the same group so that the performance of those processors can be increased. Hierarchical organization simplifies the calculations required for determining how and when to distribute power, because when tasks are complete and power is available for distribution, a relatively small number of processors are available for consideration to receive that power. The number of processors that are grouped together can be adjusted in real time based on performance factors to improve the trade-off between calculation speed and power distribution efficacy.

18 Claims, 5 Drawing Sheets

(56) References Cited

U.S. PATENT DOCUMENTS

| | | | | |
|---|---|---|---|---|
| 2014/0007111 A1* | 1/2014 | Targowski | ............ | G06F 9/522 718/102 |
| 2015/0067356 A1* | 3/2015 | Trichy Ravi | ............ | G06F 1/324 713/300 |
| 2015/0338892 A1* | 11/2015 | Culbert | ................ | G06F 1/20 713/323 |
| 2016/0187944 A1* | 6/2016 | Eastep | ................ | G06F 1/26 713/300 |

OTHER PUBLICATIONS

Cochran, R. et al., "Pack & Cap: Adaptive DVFS and Thread Packing Under Power Caps" Proceedings of the 44th Annual IEEE/ACM International Symposium on Microarchitecture, Dec. 3-7, 2011, pp. 175-185, ACM, Porto Alegre, Brazil.

Rountree, B. et al., "Beyond DVFS: A First Look at Performance Under a Hardware-Enforced Power Bound", Proceedings of the 2012 IEEE 26th International Parallel and Distributed Processing Symposium Workshops and PhD Forum, May 21-25, 2012, pp. 947-953, IEEE, Shanghai, CN.

Terzopoulos, G. et al., "Dynamic Voltage Scaling Scheduling on Power-Aware Clusters under Power Constraints", Proceedings of the 2013 IEEE/ACM 17th International Symposium on Distributed Simulation and Real Time Applications, Oct. 30-Nov. 1, 2013, pp. 72-78, IEEE, Delft, Netherlands.

Kocoloski, B. et al., "A Case for Criticality Models in Exascale Systems" 2016 IEEE International Conference on Cluster Computing, Sep. 12-16, 2016, pp. 213-216, IEEE, Taipei, Taiwan.

* cited by examiner

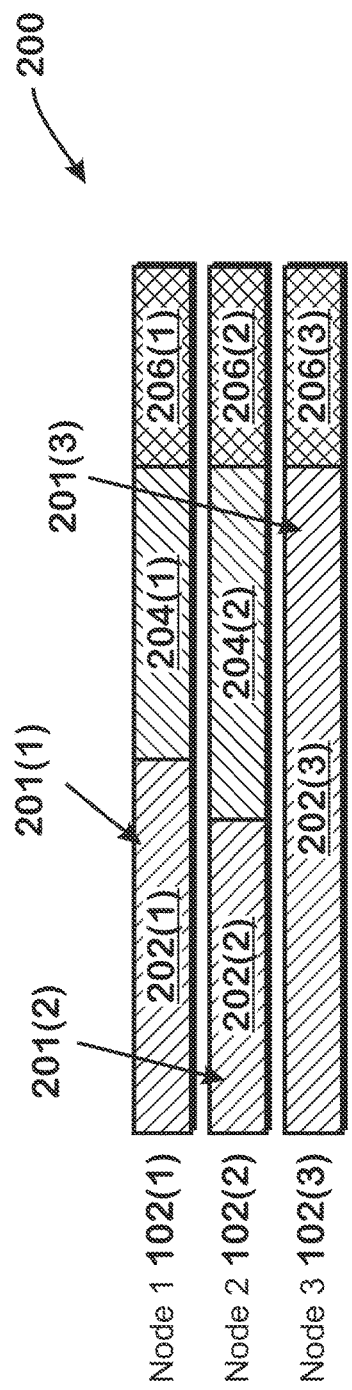
FIG. 2A
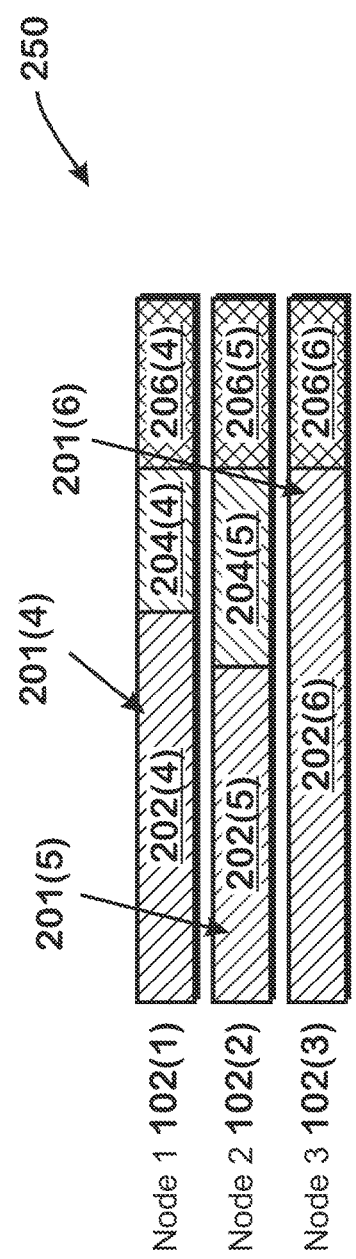
FIG. 2B
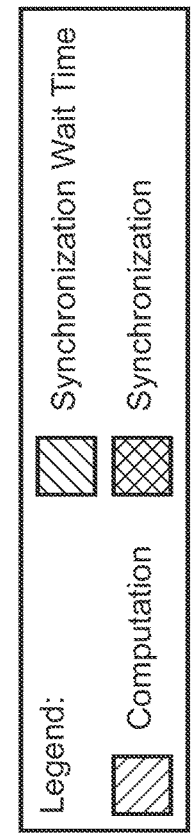

HIERARCHICAL POWER DISTRIBUTION IN LARGE SCALE COMPUTING SYSTEMS

STATEMENT OF GOVERNMENT INTEREST

This invention was made with Government support under DesignForward 2 System Integration Project with Lawrence Berkeley National Laboratory (Prime Contract No. DE-AC02-05CH11231, Subcontract No. 7216338) awarded by DOE. The Government has certain rights in this invention.

TECHNICAL FIELD

The disclosed embodiments are generally directed to large scale computing, and in particular, to hierarchical power distribution in large scale computing systems.

BACKGROUND

Massive parallel computing systems are constantly being improved upon. One aspect of such computing systems involves power and performance management. Due to the large number of elements in such systems, power and performance management is complicated. Improvements in power and performance management are needed.

BRIEF DESCRIPTION OF THE DRAWINGS

A more detailed understanding may be had from the following description, given by way of example in conjunction with the accompanying drawings wherein:

FIG. 2A illustrates aspects of synchronization operations for several processing nodes, according to an example;

FIG. 2B illustrates aspects of synchronization operations for several processing nodes for which assigned power has been adjusted as compared with the operations illustrated FIG. 2A, according to an example;

DETAILED DESCRIPTION

The present disclosure is directed to techniques for managing power distribution amongst processors in a massively parallel computer architecture. The techniques utilize a hierarchy that organizes the various processors of the massively parallel computer architecture. The hierarchy groups numbers of the processors at the lowest level. When processors complete tasks and are waiting for synchronization, the power assigned to those processors is distributed to other processors in the same group so that the performance of those processors can be increased. Hierarchical organization simplifies the calculations required for determining how and when to distribute power, because when tasks are complete and power is available for distribution, a relatively small number of processors are available for consideration to receive that power. The number of processors that are grouped together can be adjusted in real time based on performance factors to improve the trade-off between calculation speed and power distribution efficacy.

Figure 1:
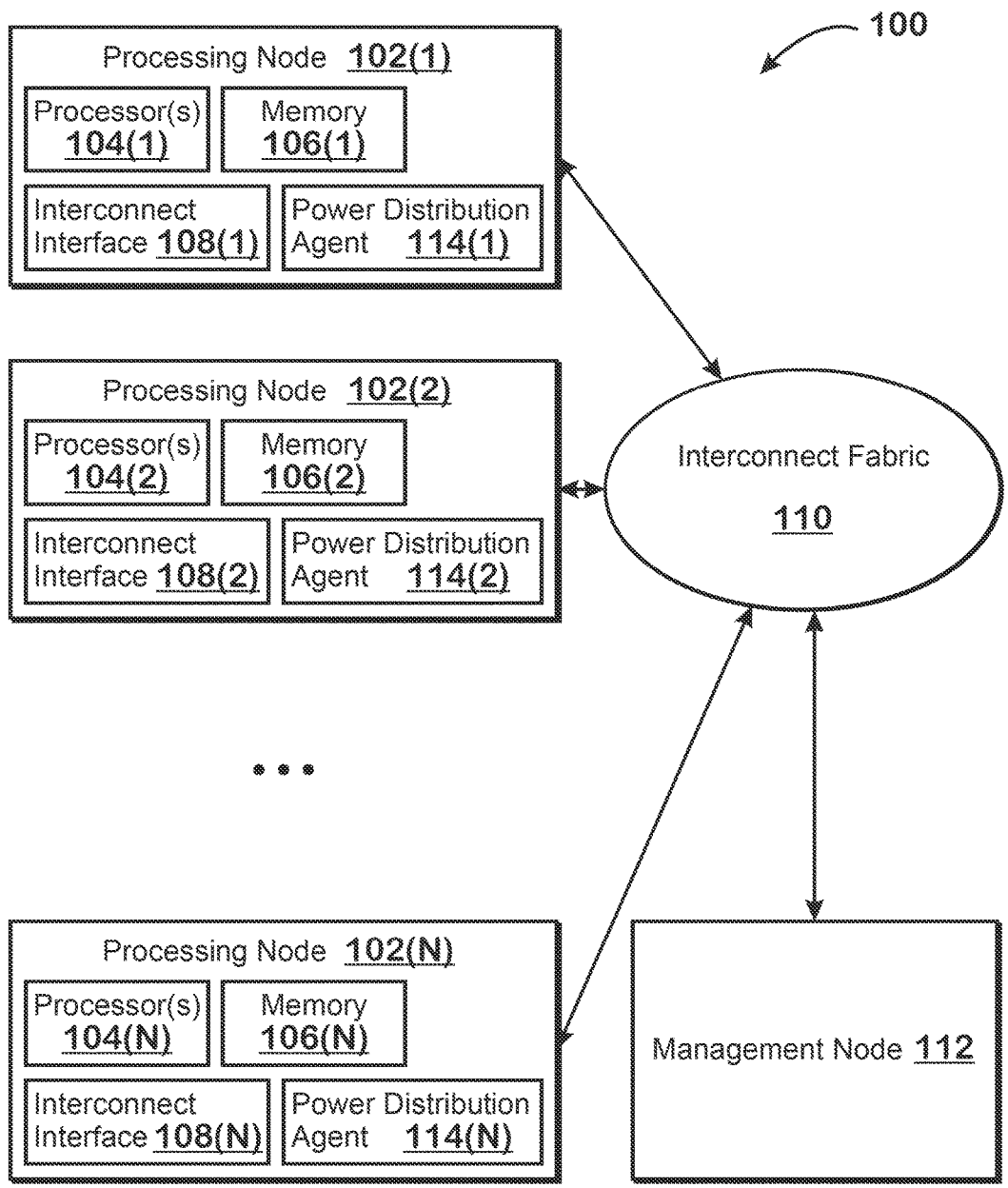
FIG. 1 is a block diagram of a high performance computer ("HPC") system, in which one or more aspects of the present disclosure are implemented, according to an example.

FIG. 1 is a block diagram of a high performance computer ("HPC") system 100, in which one or more aspects of the present disclosure are implemented, according to an example. The HPC system 100 includes multiple processing nodes 102 coupled by an interconnect fabric 110. The processing nodes 102 each include one or more processors 104, memory 106, an interconnect interface 108, and a power distribution agent 114. The interconnect fabric 110 includes one or more communication channels over which the processing nodes 102 are able to communicate with one another. Such channels include any technically feasible computer communication channels, such as Ethernet, Wi-Fi, coaxial cables, or any other channel for communication.

The processors 104 includes any type of processing device configured to process data, such as one or more central processing units (CPU), one or more graphics processing unit (GPU), one or more shared-die CPU/GPU devices, or any other processing device capable of executing instructions. The number of processors 104 in a particular processing node 102 can be very high, sufficient to support exascale-level processing loads in the HPC system 100. Different processors can be of different types such that the HPC system 100 is a heterogeneous computing system.

The memory 106 includes any combination of any of a wide variety of memory types, such as volatile memory, non-volatile memory, static random access memory, dynamic random access memory, read-only memory, readable and writeable memory, caches of various types, and/or any other type of memory suitable for storing data and supporting processing on the processing nodes 102.

The interconnect interfaces 108 are embodied as hardware, software, or a combination thereof, configured to transmit and receive data over the interconnect fabric 110. In various examples, the interconnect fabric 110 comprises a wired or wireless network that uses one or more of a variety of computer networking technologies. One or more of the processing nodes 102 may include or may communicate with one or more peripheral devices that permit communication of information with an external device or a user. The power distribution agents 114, in the processing nodes 102, are embodied as hardware, software, or a combination thereof, configured to perform power management operations such as power gating and/or dynamic voltage and frequency shifting ("DVFS") for one or more components of respective processing nodes 102 such as the processors 104.

The HPC system 100 is configured to perform workloads that are distributed across a large number of the processing nodes 102. Many such workloads include synchronization points, which are points of execution at which various threads of execution stop and "synchronize" before proceeding to subsequent operations.

The management node 112 comprises hardware, software, or a combination thereof, configured to coordinate power management activities of the power distribution agents 114 to accommodate synchronization activities of the processing nodes 102. In various implementations, the management node 112 is included within a processing node 102 or is external to the processing nodes 102 as a separate side-band system. In one implementation where the management node 112 is included within a processing node 102, the management node 112 does not control power management operations of that processing node 102.

FIG. 2A illustrates aspects of synchronization operations for several processing nodes 102, according to an example. Three processing progress bars 201 are illustrated. Each processing progress bar 201 indicates the progress made for a particular processing node 102 on a particular processing task. The processing progress bars 201 include three segments: computation segments 202, synchronization wait time segments 204, and synchronization segments 206. The computation segment 202 illustrates the duration of a computation phase, the synchronization wait time segment 204 illustrates the duration of a synchronization wait time phase, and the synchronization segment 206 illustrates the duration of a synchronization phase. The computation segments 202 represent a workload specified for execution by the processing nodes 102. The synchronization wait time segments 204 represent time after which particular processing nodes 102 have completed the computation segment 202 workload and have arrived at a synchronization point but are unable to proceed due to the fact that not all other processing nodes 102 participating in the synchronization have arrived at the corresponding synchronization point. The synchronization segments 206 represent time periods in which the processing nodes 102 perform synchronization operations, such as informing other processing nodes 102 of arrival at the synchronization point, passing data involved in synchronization, and other operations, after all participating processing nodes 102 have arrived at the synchronization point.

The synchronization wait times 204 represent time in which the corresponding processing nodes 102 are idle. More specifically, a processing node 102 experiences a synchronization wait time 204 because that processing node 102 arrived at the synchronization point before other processing nodes 102 and thus cannot proceed with other useful work. For this reason, reducing the amount of time spent in the synchronization wait time 204 is beneficial.

To reduce the amount of idle time associated with the synchronization wait times 204, the management node 112, in combination with the power distribution agents 114, is configured to manage power usage (and thus processing speed and/or idle time) for the different processing nodes 102. More specifically, the management node 112 "transfers" power from processing nodes 102 for which the computation segment 202 takes a larger amount of time to processing nodes 102 for which the computation segment 202 takes a smaller amount of time. Transferring power from a first processing node 102 to a second processing node 102 means reducing the allowed amount of power available to the first processing node 102 for processing and increasing the allowed amount of power available to the second processing node 102 for processing. More specifically, the HPC system 100 has a power budget that represents a total amount of power for distribution among the various processing nodes 102 to perform processing tasks. The amount of power distributed to a particular processing node 102 can be reduced (or increased), which results in a lower (higher) processing capacity. The power taken away from a particular processing node 102 can be redistributed to a different processing node 102, to increase the processing capacity of that processing node 102.

As described above, different processing nodes 102 may complete processing tasks in different amounts of time. This disparity results in idle synchronization wait time for the processing nodes 102 that complete processing tasks in lower amounts of time than other processing nodes 102. Processing power can be redistributed from the processing nodes 102 with higher wait time to processing nodes 102 with lower or zero wait time. This transfer of power results in less overall idle time because the processing nodes 102 reach the synchronization point at an earlier time. More specifically, by transferring power away from a first processing node 102 that arrives at a synchronization point earlier to a second processing node 102 that arrives at a synchronization point later, the second processing node 102 is able to arrive at the synchronization point earlier. Even though the first processing node 102 arrives at the synchronization point earlier than without the transfer, both processing nodes 102 arrive at the synchronization point at an earlier time than both would if the power transfer did not occur.

FIG. 2B illustrates aspects of synchronization operations for several processing nodes 102 for which assigned power has been adjusted as compared with the operations illustrated FIG. 2A, according to an example. As shown in FIG. 2A, node 1 102(1) and node 2 102(2) complete the computation segments 202 before node 3 102(3), which results in a large amount of synchronization wait time 204. In FIG. 2B, the management node 112 power has been transferred from node 102(1) and node 102(2) to node 102(3). This transfer results in the computation segment (modified) 204(4) for node 1 102(1) and the computation segment (modified) 204(5) for node 2 102(2) to be lengthened with respect to the unmodified computation segments 204 for the same nodes 102 illustrated in FIG. 2A. However, by distributing the power to node 3 102(3), the computation segment (modified) 202(6) for node 3 102(3) is reduced in time as compared with the corresponding computation segment 202(3) for node 3 102(3) in FIG. 2A. As a result of this redistribution of power, the time at which each of the nodes 102 arrive at the synchronization point is earlier than the time at which the nodes 102 arrive at the synchronization point in FIG. 2A, where power redistribution does not occur. Thus, utilizing the power redistribution technique results in shorter overall execution time for all processing nodes 102 as compared with not utilizing the power redistribution technique.

The management node 112 and power distribution agents 114 perform power redistribution according to several techniques. DVFS is used to slow down and speed up processing nodes 102 during the computation phase. More specifically, the clock frequency is reduced for a processing node 102 determined to require less power due to the fact that the computation phase is shorter than the computation phases for other processing nodes 102. The reduction in clock frequency is accompanied by a reduction in voltage for that processing node 102, which results in less power consumed for that node. The resulting "reclaimed" power is "shifted" to processing nodes 102 that are to execute a computation phase that is more processing intensive. Shifting the power means that additional power budget is available and can be used by the DVFS technique. A processing node 102 to which power has been shifted increases operating voltage and frequency, consuming the additional available power and increasing performance.

The management node 112 causes DVFS to occur in two situations. In a first situation for applying DVFS, the management node 112 periodically re-determines an amount of power to afford to each processing node 102 and informs the processing nodes 102 regarding their assigned power. The time at which the management node 112 determines an amount of power to afford each processing node 102 may be referred to herein as the "periodic redistribution time." In one example, the periodic redistribution time occurs every time a particular amount of time (such as 10 ms) has elapsed. In various examples, the determination regarding how to redistribute power is made based on a variety of factors, such as, without limitation, processing history, predictions regarding how long each processing node 102 would take to execute assigned computation phases, number of instructions executed, number of external memory accesses, and activity level on the processing node 102. In general, the management node 112 attempts to "even out" the time spent in the computation phase for each processing node 102. Thus, for nodes predicted to have a higher than average time to complete the computation phase for the previously-set power level for that processing node 102, the management node 112 assigns additional power to that processing node 102. For nodes predicted to have a lower than average time to complete the computation phase for the previously-set power level for that processing node 102, the management node 112 reclaims power from that processing node 102.

In a second situation for applying DVFS, when a processing node 102 completes the computation phase, the management node 112 "reclaims" the power for that processing node and redistributes the reclaimed power to other processing nodes 102 that have not yet completed the computation phase so that those processing nodes 102 are sped up and can arrive at the synchronization point more quickly. Depending on the amount of time required to determine how to redistribute that power, the management node 112 may redistribute power every time a processing node 102 reaches the synchronization point, or less frequent than that. For processing nodes 102 to which power is shifted, DVFS is applied to increase the processing speed of such nodes. In addition, in some situations or in some implementations, once a processing node 102 is complete with the computation phase and power is shifted away from that processing node 102, the management node 112 causes at least a portion of processing elements in that processing node 102 to be power gated. Power gating is a technique whereby power consumed by processing elements is reduced by shutting off current to the processing elements. A processing node 102 that has been power gated is woken up at a later time to continue with the synchronization phase and subsequent processing.

One issue with power gating is that there is a certain amount of latency associated with being restarted after power gating. Thus, a power distribution agent 114 within a processing node 102 that completes the computation phase determines whether to initiate power gating for that processing node 102. Several techniques for determining whether to begin power gating are provided. In a first technique, the power distribution agent 114 for a processing node 102 records a history of previous work that indicates the length of time between completing the computation phase and when the synchronization phase begins. Based on this history, when the processing node 102 completes the computing phase, the power distribution agent 114 determines whether initiating power gating would be appropriate. Power gating is effective for long waiting times to amortize the wake-up latency. If the history predicts long wait times w, the power gating mechanism can start.

In another technique, the management node 112 informs each power distribution agent 114 of whether substantially each other processing node 102 is operating close to the thermal design power, where "substantially each other processing node 102" refers to a number of processing nodes equal to or greater than a threshold percent of the other processing nodes 102 in the HPC system 100 and wherein "close to the thermal design power" means at or above a threshold percentage of the maximum power at which the processing nodes 102 are able to operate (more precisely, the thermal design power is the maximum heat generation for which a cooling system is able to dissipate the heat). If substantially each other processing node 102 is operating close to the thermal design power, then power cannot be transferred to any other processing node 102 (or very little power can be transferred to any other processing node 102). In this situation, the power that could be "reclaimed" by power gating a processing node 102 cannot be distributed to another processing node 102, or at least such distribution could not be used effectively or could not benefit the overall HPC system 100 to a degree that would overcome the latency associated with power gating. Thus, if substantially each other processing node 102 is operating close to the thermal design power, then a processing node 102 that completes the computation phase does not begin power gating and instead simply waits until all other processing nodes 102 have arrived at the synchronization point. In yet another technique, after a processing node 102 has completed the computation phase, the processing node 102 repeatedly polls the interconnect fabric 110 to determine if all other processing nodes 102 have arrived at the synchronization point. If all the other processing nodes 102 have not yet arrived at the synchronization point after a threshold amount of time, then the processing node 102 begins power gating. The purpose of repeat polling prior to the threshold amount of time is to avoid latency associated with power gating in the event that when the processing node 102 completes the computation phase, there is only a small amount of time left for all the other processing nodes 102 to complete their computation phases.

As described above, when a processing node 102 has completed the computation phase, the power for that processing node 102 can be redistributed among other processing nodes 102 in the HPC system 100. Because the HPC system 100 may include an extremely large number of processing nodes 102 (for example, in an exascale computing system, hundreds of thousands or millions of processing nodes 102), the processing time required to assign power among different processing nodes 102 would be very high. For this reason, the management node 112 redistributes power according to a hierarchy.

Figure 3:
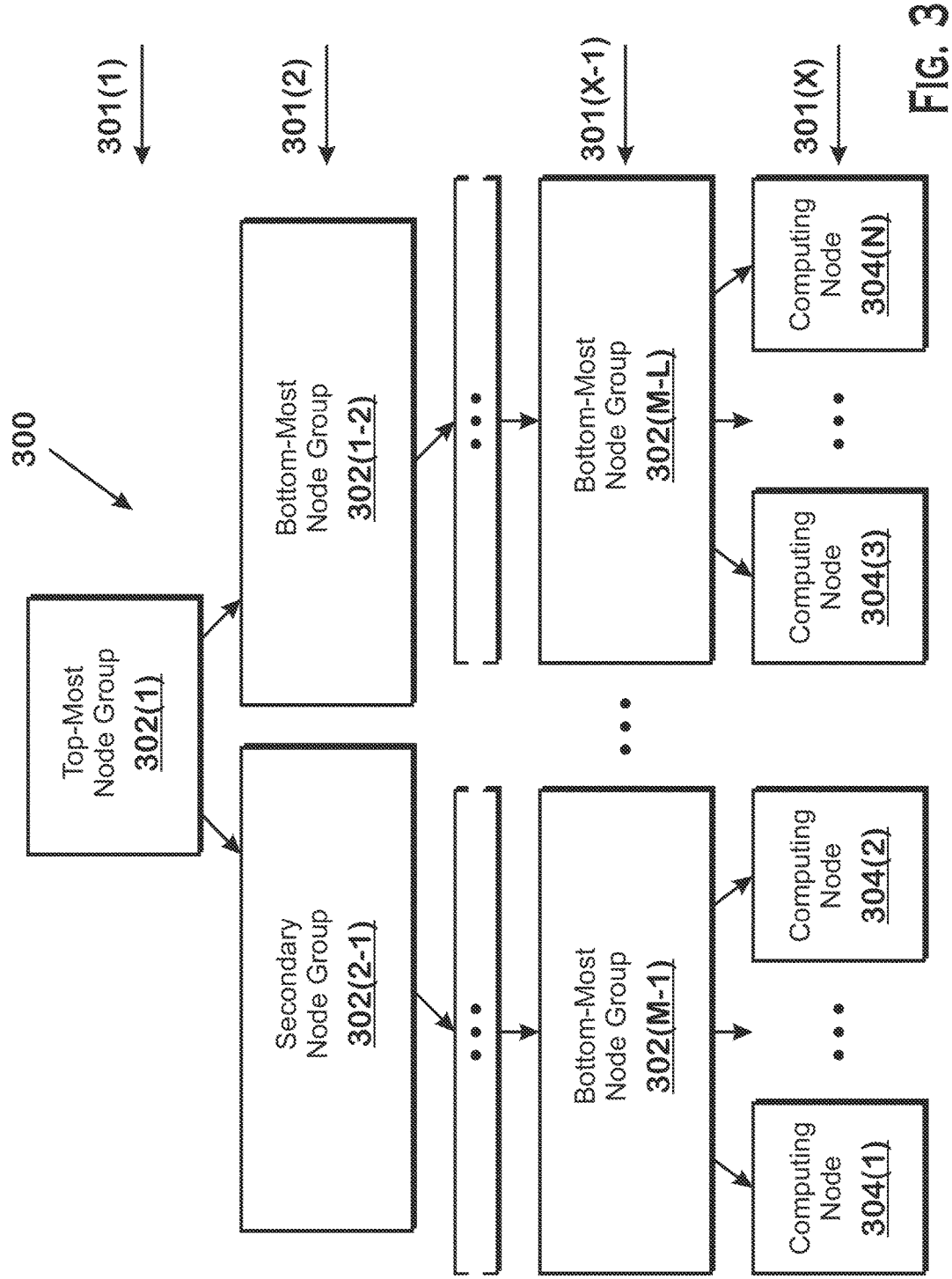
FIG. 3 illustrates a computing node hierarchy, associated with the manner in which the management node redistributes power from processing nodes that have completed the computation segment to other processing nodes, according to an example.

FIG. 3 illustrates a computing node hierarchy, associated with the manner in which the management node 112 redistributes power from processing nodes 102 that have completed the computation segment to other processing nodes 102, according to an example. The hierarchy 300 represents a logical organization of the processing nodes 102 that exists for the purpose of efficiently distributing power among the processing nodes 102. The processing nodes 102 are reflected in the hierarchy as computing nodes 304. All node groups 302 are not specifically associated with any particular processing node 102 but are simply mechanisms for logically organizing the computing nodes 304.

The hierarchy 300 includes a number (X) of hierarchy levels 301. M is the number of node group hierarchy levels, where M=X−1, because there is one hierarchy level that is not a node group hierarchy level, but is instead the computing node hierarchy level. This hierarchy level is the bottom-most hierarchy level. L is the number of bottom-most node groups 302(M) in the second-to-bottom hierarchy level 301(X−1). There are N computing nodes 304 in the bottom-most hierarchy level 301(X). The bottom-most hierarchy level 301(X) includes computing nodes 304 that represent the processing nodes 102 of the HPC system 100. The other hierarchy levels 301 are intermediate hierarchy levels 301(2)-301(X−1) or the base level 301(1). The hierarchy 300 may include any number of hierarchy levels 301. Herein, a node group 302 or a computing node 304 is said to descend from, or to be a descendant of, another node if an arrow points from the other node to the descending node. For example, computing node 304(1) descends from the bottom-most node group 302(M−1). A node group 302 is said to be a sister of another node group 302 if both node groups 302 descend from the same node group 302. For example, secondary node group 302(2-1) is a sister of secondary node group 302(1-2). Similarly, a computing node 304 is said to be a sister of another computing node 304 if both computing nodes 304 descend from the same node group 302. For example, computing node 304(1) is the sister of computing node 304(2) but is not the sister of computing node 304(3) or computing node 304(N). A first node group 302 is said to be a parent of a second node group 302 if an arrow points from the first node group 302 to the second node group 302. For example, the top-most node group 302(1) is the parent of the secondary node group 302(2-1).

The purpose of the hierarchy 300 is to limit the number of computing nodes 304 or hierarchy levels 301 that are considered for power redistribution. More specifically, when a processing node 102 completes a computing phase, the management node 112 reclaims the power from the completed processing node 102 and redistributes that power to other processing nodes 102. Power is redistributed according to the hierarchy. More specifically, when a processing node 102 completes a computing phase, the management node 112 redistributes the power from that processing node 102 to processing nodes 102 associated with sister computing nodes 304 for the completed processing node 102, if there is at least one such processing node 102 that has not yet reached the synchronization point. For example, if the processing node 102 associated with computing node 304(1) reaches the synchronization point before the processing node 102 associated with computing node 304(2) (or other processing nodes 102 associated with computing nodes 304 that descend from node group 302(M−1)), then the management node 112 redistributes the power from the processing node 102 associated with computing node 304(1) to the processing nodes 102 associated with the other computing nodes 304 that descend from the node group 302.

A node group 302 is said to be fully complete if all computing nodes 304 that descend from that node group 302 are associated with processing nodes 102 that have arrived at the synchronization point. For example, the bottom-most node group 302(M−1) is said to be fully complete if computing node 304(1), computing node 304(2), and all other computing nodes 304 that descend from the bottom-most node group 302(M−1) are associated with processing nodes 102 that have arrived at the synchronization point. If a node group 302 is fully complete, then the management node 112 distributes the power for all computing nodes 304 that descend from the node group 302 to other processing nodes 102.

The management node 112 determines the manner in which to distribute the power as follows. The management node 112 determines whether the fully complete node group 302 has any siblings that are not fully complete. If there are such siblings, then the management node 112 distributes the power to those siblings. Distributing power to a node group 302 means that the power is distributed to computing nodes 304 that are descendants of that node group 302, for use by associated processing nodes 102. Power can be distributed in any technically feasible manner, such as evenly, or unevenly, taking into account a "required" amount of power for the various processing nodes 102 (for example, if a first processing node 102 is predicted to spend more time in the computation than a second processing node 102, more power is distributed to the first processing node 102).

If the node group 302 has no siblings that are not fully complete (i.e., if all of the siblings of the node group 302 are fully complete), then the management nodes 112 redistributes the power of the fully complete node group 302 and of all fully complete siblings of that fully complete node group 302 up the hierarchy 300, for distribution to other computing nodes 304. More specifically, the management node 112 traverses up the hierarchy 300 parent by parent, from the fully complete node group 302, until the management node 112 arrives at a node group 302 that has at least one child node group 302 that is not fully complete and distributes the power to the arrived-at node group 302 for distribution to descendant computing nodes 304 that have not yet reached the synchronization point. As stated above, this distribution can occur in any technically feasible manner, such as evenly or in a need-based manner.

Stated differently, if the node group 302 that became fully complete is the last descendant that has become complete, of a second node group 302, then the management node 112 distributes all power assigned to the computing nodes 304 that are descendants of the second node group 302 to other computing nodes 304. The power is distributed to the non-fully-complete siblings of the lowest node group 302 in the hierarchy 300, that has non-fully-complete siblings, from which the node group 302 that became fully complete descends.

As described above, at the periodic redistribution time, the management node 112 determines an amount of power to afford each node group 302 and each node 304. In addition, the management node 112 also determines whether to redistribute the processing nodes 304 among the different bottom-most node groups 302(M). More specifically, as described above, one purpose of organizing the computing nodes 304 into a hierarchy 300 is to reduce the amount of latency associated with determining how to distribute power among the different processing nodes 102 that would exist if such a determination would have to be made among a large number of processing nodes 102.

The number of computing nodes 304 grouped together for this purpose can change. This number refers to the number of computing nodes 304 that are children of any particular bottom-most node group 302. With a lower number, power is redistributed in a coarser manner, but with redistribution incurring less latency, while with a greater number, power is redistributed in a finer manner, but with redistribution incurring greater latency.

A technique for determining the number of computing nodes 304 to group together (the "group size") is now provided. The technique attempts to maximize the value of $L_k$, which is equal to $b_k/a_k$, where k is the periodic redistribution time number (which increases each time another periodic redistribution time occurs), where $a_k$ is the communication delay in the group at time k, and where $b_k$ is the probability that one or more nodes in a group complete execution (the computation phase) during the time interval $a_k$. The reason why the technique attempts to maximize $L_k$ is that the technique attempts to maximize the number of nodes in a group in order to improve the ability to redistribute power, but also to minimize the delay between periodic redistribution times. Maximizing $L_k$, which is represented as the probability that one of more nodes completes execution in a group divided by the delay thus maximizes that probability while minimizing the delay.

In an example, the value $L_k$ is maximized as follows. At any particular periodic redistribution time k, the management node 112 identifies a group size $s_k$. For a subsequent periodic redistribution time, $s_{k+1}=s_k+t_k*dL_k$, where $t_k=1/k^{0.6}$ and $dL_k$ is the derivative of $L_k$ with respect to the group size. The particular exponent for $t_k$ is an example and can be varied as desired. When $dL_k$ is zero, $s_{k+1}=s_k$, and thus $s_k$ does not change from one periodic redistribution time to the next. At this point, the "optimal" value for group size has been found—$L_k$ has been maximized because the derivative of $L_k$ with respect to group size is zero. The initial group size so can be chosen as any number and adjusted according to the above technique at each periodic redistribution time.

In various examples, the values $a_k$ (communication delay) and $b_k$ (probability that one or more nodes complete execution) are determined in an offline manner (e.g., pre-determined before run-time) or an online manner (e.g., determined while workloads are being executed on the processing nodes 102).

In one example, $b_k$ (probability that one or more nodes completes execution) is determined based on pre-determined analysis of the workload being performed in the group. More specifically, prior to actually executing the work, the management node 112 or another system executes the work or work of a similar type (e.g., a test workload) to the workload and collects data indicating how much time each processing node 102 stays in the computation phase. The management node 112 or other system generates a profile or distribution for the work type that includes a collection of such measurements. The management node 112 or other system generates a cumulative distribution function for that distribution. During each periodic redistribution time, the management node 112 uses the cumulative distribution function to determine the probability that a node in the group will complete the compute phase. In some examples, the management node 112 updates the distribution based on observed runtime values to generate more accurate results.

In addition, the management node 112 or another system obtains data that indicates how the group delay changes as the group size changes (the derivative of $a_k$ with respect to group size, which can be used to construct the derivative of $L_k$ with respect to group size). With this data, the management node 112 or another system computes the derivative of group delay with respect to group size.

It should be understood that the above technique is just one example and any technically feasible technique to dynamically modify group size is possible. For example, any technically feasible technique for maximizing the value of $L_k$ can be used.

Figure 4:
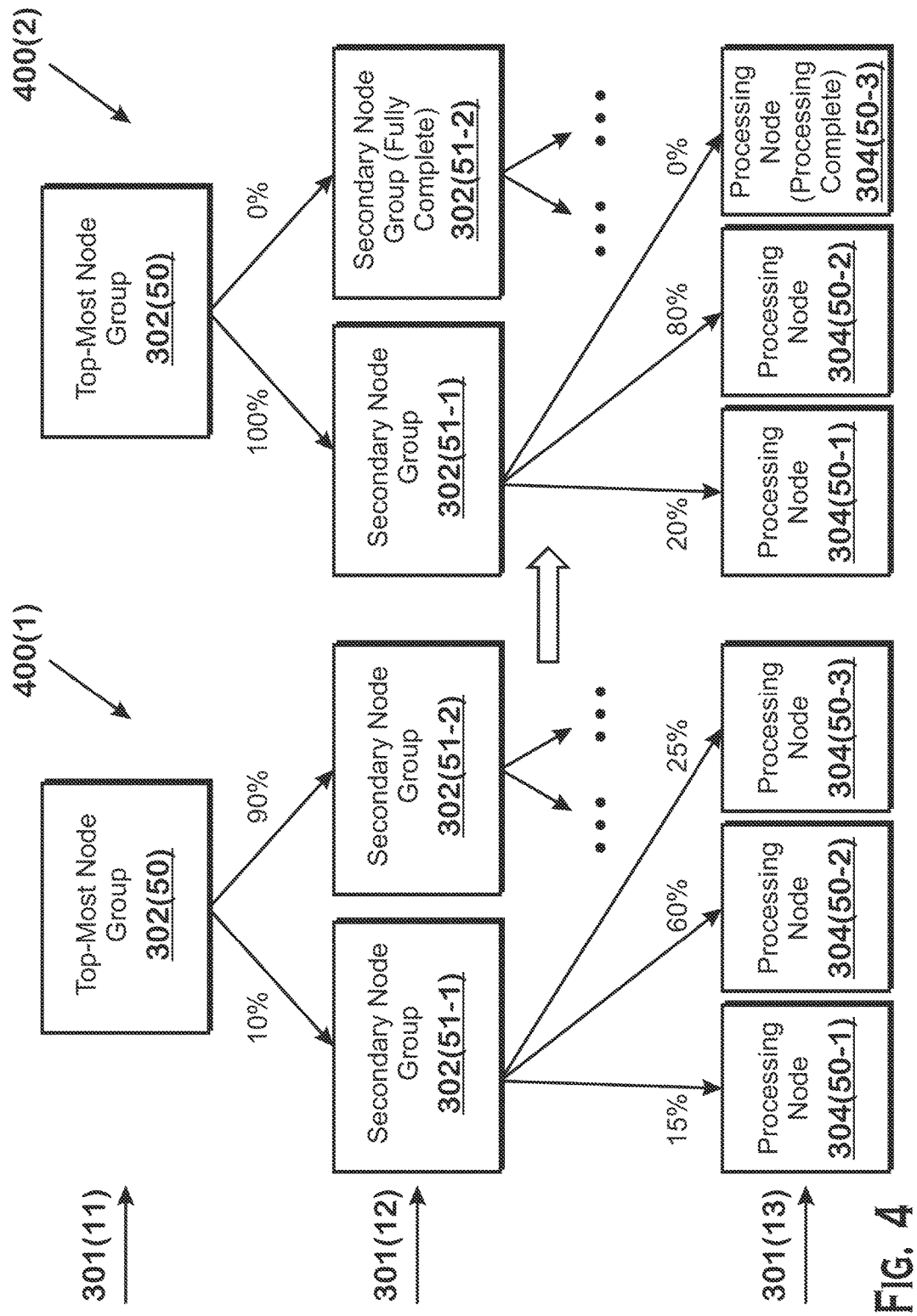
FIG. 4 illustrates an example hierarchy in a first state and a second state, according to an example.

FIG. 4 illustrates an example hierarchy 400 in a first state 400(1) and a second state 400(2), according to an example. The example hierarchy 400 is of the same type as the hierarchy 300 of FIG. 3. A reduced number of hierarchy levels 301 (3) are included in the hierarchy 400 as compared with the hierarchy 300 of FIG. 3, for simplicity of explanation.

In the hierarchy 400, the top-most node group 302(50) has two children: secondary node group 302(51-1) and secondary node group 302(51-2). Secondary node group 302(51-1) has three children: processing node 304(50-1), processing node 304(50-2), and processing node 304(50-3). Secondary node group 302(51-2) has children, but those children are not illustrated for simplicity.

In the state 400(1), all node groups 302 and processing nodes 304 shown are not yet "complete." This means that none of the illustrated processing nodes 304 have reached the synchronization point and that all node groups 302 shown have at least one descendant processing node 304 that has not yet reached the synchronization point. A particular power distribution is illustrated with percentage numbers. The top-most node group 302(50) is associated with the entire HPC system 100 and has a particular power budget. 10% of that power budget is assigned to the secondary node group 302(51-1) and 90% of that power budget is assigned to the secondary node group 302(51-2). Of the power assigned to the secondary node group 302(51-1), 15% of that power is assigned to the processing node 304(50-1), 60% of that power is assigned to the processing node 304(50-2), and 25% of the power is assigned to the processing node 304(50-3). The power distribution for children of the secondary node group 302(51-2) is not illustrated.

In the state 400(2), the processing node 304(50-3) has arrived at the synchronization point. Thus, the management node 112 has redistributed the power assigned to the processing node 304(50-3) to the other processing nodes 304 that are siblings of the processing node 304(50-3), which are processing node 304(50-1) and processing node 304(50-2). The power assigned to those processing nodes 304 are now 20% and 80% respectively.

In addition, the secondary node group 302(51-2) is fully complete. As stated above, being fully complete means that all processing nodes 304 that are descendants of the secondary node group 302(51-2) have arrived at the synchronization point. Because the secondary node group 302(51-2) is fully complete, and because the secondary node group 302(51-2) has a sister that is not fully complete, the management node 112 has redistributed the power of the fully complete node group 302(51-2) to that sibling node group 302(51-1). Now the node group 302(51-1) is assigned 100% of the power for the top-most node group 302(50). Thus the percentages shown for the processing node 304(50-1) and the processing node 304(50-2) are percentages of that 100%, rather than of the previously-assigned 10% as shown in state 400(1).

Figure 5:
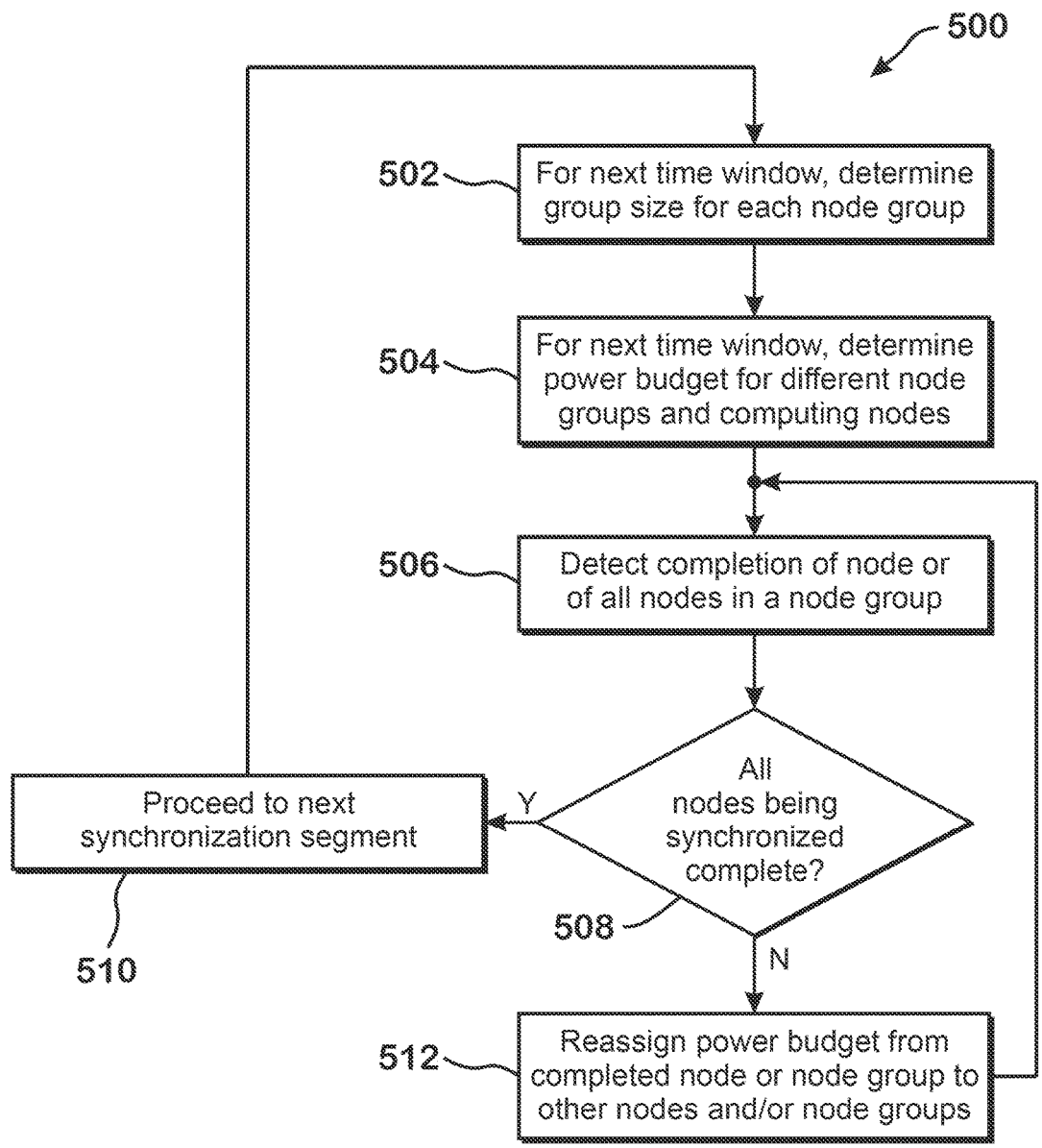
FIG. 5 is a flow diagram of a method for distributing power among processing nodes in a HPC system, according to an example.

FIG. 5 is a flow diagram of a method 500 for distributing power among processing nodes 102 in a HPC system 100, according to an example. Although described with respect to the system shown and described with respect to FIGS. 1-4, it should be understood that any system configured to perform the method, in any technically feasible order, falls within the scope of the present disclosure.

The method 500 begins at step 502, where the management module 112 arrives at a distribution determination point and determines a group size for each node group. The group size is determined to strike a balance between the amount of time used to determine power redistribution among computing nodes 304 and the effectiveness of that power redistribution (which, in one example, is based on the possibility that a processing node will finish the computing phase in any given periodic redistribution time period).

At step 504, the management module 112 determines, for the distribution determination point, a power budget for different node groups 302 and computing nodes 304. The power budgets can be determined in any technically feasible manner. In one example, power budgets are determined based on history. More specifically, for any hierarchy level 301 in the hierarchy 300, the management module 112 determines whether a particular element (node group 302 or node 304) took more than average for that level or less than average for that level to reach the synchronization point. The management module 112 redistributes power from elements that took less time to elements that took more time. Any other technically feasible technique for shifting power is possible.

At step 506, the management module 112 detects completion of a node group 302 or node 304. "Completion" for a node 304 means that the associated processing node 102 has reached the synchronization point. "Completion" for a node group 302 means that the processing nodes 102 associated with all descendant nodes of that node group 302 have reached the synchronization point. At step 508, the management node 112 determines whether all processing nodes 102 being synchronized have reached the synchronization point. If so, the method 500 proceeds to step 510, where the method 500 proceeds to the next synchronization segment (e.g., the next group of computation phase, synchronization wait phase, and synchronization phase) and returns to step 502. If, at step 508, not all nodes that are being synchronized have reached the synchronization point, then the method 500 proceeds to step 512.

At step 512, the management module 112 reassigns power from the completed node or node group to other nodes or node groups. Power from a completed node or node group is assigned to sister node or node groups unless no uncompleted sister exists. In that situation, the power is assigned up the hierarchy until a parent with at least one uncompleted child is found, and the power is assigned among those one uncompleted children, and is then redistributed back down to the uncompleted descendants of those children.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for redistributing power among a plurality of processing nodes of a computing system, the method comprising:

assigning a power distribution to the plurality of processing nodes included in a processing node hierarchy that indicates a hierarchical relationship between the plurality of processing nodes, the power distribution identifying an amount of power afforded to each of the processing nodes, wherein the processing node hierarchy includes a plurality of groups that each includes a plurality of processing nodes;

detecting arrival of a processing node of the plurality of processing nodes at a synchronization point;

responsive to detecting the arrival of the processing node at the synchronization point, reclaiming the power assigned to the processing node for distribution to one or more processing nodes of the plurality of processing nodes;

redistributing the reclaimed power to one or more of the plurality of processing nodes according to the processing node hierarchy, wherein power is distributed only to processing nodes in a group that includes the processing node if at least one other processing node in the group has not yet arrived at the synchronization point; and dynamically adjusting sizes of the groups of the plurality of groups based on communication delays of the groups and based on probabilities that one or more nodes in the groups complete execution during a communication delay.

2. The method of claim 1, wherein:

the processing node hierarchy comprises a plurality of computing nodes, each computing node associated with a different processing node and a plurality of node groups, wherein each processing node depends from a node group of the plurality of node groups, and each node group except for a top-most node group descends from another node group of the plurality of node groups;

computing nodes having an identical parent are considered to be sister computing nodes; and processing nodes associated with sister computing nodes are considered to be sister processing nodes.

3. The method of claim 2, further comprising:

responsive to detecting arrival of the processing node, detecting that one or more sister processing nodes of the processing node have not yet arrived at the synchronization point, wherein redistributing the reclaimed power comprises redistributing the claimed power to the sister processing nodes but not to any other node of the plurality of processing nodes of the computer system.

4. The method of claim 2, further comprising:

responsive to detecting arrival of the processing node, detecting that all sister processing nodes of the processing node have arrived at the synchronization point, wherein redistributing the reclaimed power comprises redistributing the claimed power to other processing nodes according to the processing node hierarchy.

5. The method of claim 4, wherein redistributing the reclaimed power to other processing nodes according to the processing node hierarchy comprises:

traversing up the hierarchy until a node group having sisters that have descendants that have not reached the synchronization point is found; and distributing the reclaimed power to the sisters that have descendants that have not reached the synchronization point.

6. The method of claim 1, wherein reclaiming the power assigned to the processing node comprises:

power gating the processing node to reduce power consumed by the processing node by a power amount.

7. The method of claim 6, wherein:
redistributing the reclaimed power to one or more of the plurality of processing nodes comprises assigning the power amount among the one or more of the plurality of processing nodes.

8. The method of claim 7, wherein assigning the power amount among the one or more of the plurality of processing nodes comprises:
utilizing dynamic voltage and frequency scaling to adjust the operating voltage and operating frequency of the one or more of the plurality of processing nodes according to the power amount.

9. A computing system, comprising:
a plurality of processing nodes; and
a management node, configured to redistribute power among the plurality of processing nodes by:
assigning a power distribution to the plurality of processing nodes included in a processing node hierarchy that indicates a hierarchical relationship between the plurality of processing nodes, the power distribution identifying an amount of power afforded to each of the processing nodes, wherein the processing node hierarchy includes a plurality of groups that each includes a plurality of processing nodes;
detecting arrival of a processing node of the plurality of processing nodes at a synchronization point;
responsive to detecting the arrival of the processing node at the synchronization point, reclaiming the power assigned to the processing node for distribution to one or more processing nodes of the plurality of processing nodes; and
redistributing the reclaimed power to one or more of the plurality of processing nodes according to the processing node hierarchy, wherein power is distributed only to processing nodes in a group that includes the processing node if at least one other processing node in the group has not yet arrived at the synchronization point; and
dynamically adjusting sizes of the groups of the plurality of groups based on communication delays of the groups and based on probabilities that one or more nodes in the groups complete execution during a communication delay.

10. The computing system of claim 9, wherein:
the processing node hierarchy comprises a plurality of computing nodes, each computing node associated with a different processing node and a plurality of node groups, wherein each processing node depends from a node group of the plurality of node groups, and each node group except for a top-most node group descends from another node group of the plurality of node groups;
computing nodes having an identical parent are considered to be sister computing nodes; and
processing nodes associated with sister computing nodes are considered to be sister processing nodes.

11. The computing system of claim 10, wherein the management node is further configured to:
responsive to detecting arrival of the processing node, detect that one or more sister processing nodes of the processing node have not yet arrived at the synchronization point,
wherein redistributing the reclaimed power comprises redistributing the claimed power to the sister processing nodes but not to any other node of the plurality of processing nodes of the computer system.

12. The computing system of claim 10, wherein the management node is further configured to:
responsive to detecting arrival of the processing node, detect that all sister processing nodes of the processing node have arrived at the synchronization point,
wherein the management node is configured to redistribute the reclaimed power by redistributing the claimed power to other processing nodes according to the processing node hierarchy.

13. The computing system of claim 12, wherein the management is configured to redistribute the reclaimed power to other processing nodes according to the processing node hierarchy by:
traversing up the hierarchy until a node group having sisters that have descendants that have not reached the synchronization point is found; and
distributing the reclaimed power to the sisters that have descendants that have not reached the synchronization point.

14. The computing system of claim 9, wherein the management node is configured to reclaim the power assigned to the processing node by:
power gating the processing node to reduce power consumed by the processing node by a power amount.

15. The computing system of claim 14, wherein the computing system is configured to redistribute the reclaimed power to one or more of the plurality of processing nodes by:
assigning the power amount among the one or more of the plurality of processing nodes.

16. The computing stem of claim 15, wherein the management node is configured to assign the power amount among the one or more of the plurality of processing nodes by:
utilizing dynamic voltage and frequency scaling to adjust the operating voltage and operating frequency of the one or more of the plurality of processing nodes according to the power amount.

17. A non-transitory computer-readable medium storing instructions that, when executed by a processor, cause the processor to:
assign a power distribution to the plurality of processing nodes included in a processing node hierarchy that indicates a hierarchical relationship between the plurality of processing nodes, the power distribution identifying an amount of power afforded to each of the processing nodes, wherein the processing node hierarchy includes a plurality of groups that each includes a plurality of processing nodes;
detect arrival of a processing node of the plurality of processing nodes at a synchronization point;
responsive to detecting the arrival of the processing node at the synchronization point, reclaim the power assigned to the processing node for distribution to one or more processing nodes of the plurality of processing nodes; and
redistribute the reclaimed power to one or more of the plurality of processing nodes according to the processing node hierarchy, wherein power is distributed only to processing nodes in a group that includes the processing node if at least one other processing node in the group has not yet arrived at the synchronization point; and
dynamically adjust sizes of the groups of the plurality of groups based on communication delays of the groups and based on probabilities that one or more nodes in the groups complete execution during a communication delay.

18. The non-transitory computer-readable medium of claim 17, wherein:
- the processing node hierarchy comprises a plurality of computing nodes, each computing node associated with a different processing node and a plurality of node groups, wherein each processing node depends from a node group of the plurality of node groups, and each node group except for a top-most node group descends from another node group of the plurality of node groups;
- computing nodes having an identical parent are considered to be sister computing nodes; and
- processing nodes associated with sister computing nodes are considered to be sister processing nodes.

* * * * *